US008856870B1

(12) United States Patent
Maeng

(10) Patent No.: US 8,856,870 B1
(45) Date of Patent: Oct. 7, 2014

(54) METHODS, DEVICES, AND MEDIUMS ASSOCIATED WITH DYNAMIC FORUM GENERATION

(75) Inventor: Joon Maeng, Newcastle, WA (US)

(73) Assignee: Intellectual Ventures Fund 79 LLC, Las Vegas, NV (US)

( * ) Notice: Subject to any disclaimer, the term of this patent is extended or adjusted under 35 U.S.C. 154(b) by 460 days.

(21) Appl. No.: 12/983,874

(22) Filed: Jan. 3, 2011

(51) Int. Cl.
*G06F 7/04* (2006.01)
*G06F 17/30* (2006.01)

(52) U.S. Cl.
USPC .............................. 726/2; 709/227; 709/228

(58) Field of Classification Search
USPC ........... 705/2, 27, 35; 707/755, 999; 709/204, 709/205, 206, 227
See application file for complete search history.

(56) References Cited

U.S. PATENT DOCUMENTS

| | | | |
|---|---|---|---|
| 7,058,578 B2 * | 6/2006 | Michelson et al. | 704/270.1 |
| 7,076,546 B1 * | 7/2006 | Bates et al. | 709/224 |
| 7,418,437 B1 * | 8/2008 | Marks | 1/1 |
| 2003/0041032 A1 * | 2/2003 | Ballin et al. | 705/51 |
| 2003/0084103 A1 * | 5/2003 | Weiner et al. | 709/205 |
| 2003/0112948 A1 * | 6/2003 | Brown et al. | 379/207.04 |
| 2005/0240568 A1 * | 10/2005 | Banerjee et al. | 707/2 |
| 2008/0294720 A1 * | 11/2008 | Facemire et al. | 709/204 |
| 2009/0048825 A1 * | 2/2009 | Granger et al. | 704/200 |
| 2009/0070197 A1 * | 3/2009 | Ermolli | 705/10 |
| 2009/0138317 A1 * | 5/2009 | Schoenberg | 705/9 |
| 2009/0204469 A1 * | 8/2009 | Markram | 705/9 |
| 2009/0292680 A1 * | 11/2009 | Sabnani | 707/3 |
| 2011/0179180 A1 * | 7/2011 | Schleifer et al. | 709/227 |
| 2012/0110099 A1 * | 5/2012 | Fujihara et al. | 709/206 |

* cited by examiner

*Primary Examiner* — Andrew Nalven
*Assistant Examiner* — Huan V Doan
(74) *Attorney, Agent, or Firm* — Stolowitz Ford Cowger LLP

(57) ABSTRACT

A method, device, or medium may be associated with receiving a request for information. A subject matter may be related to the request. A forum may be generated comprising members associated with the subject matter. A session of the forum may be initiated. The session may be configured to elicit a response to the request. The forum may be disbanded in response to a conclusion of the session.

28 Claims, 7 Drawing Sheets

| | Member | Attribute | Score | Active Forum |
|---|---|---|---|---|
| 812 | JM12 | Hiking | 9 | Mt. Rainier |
| | | Car Racing | 7 | |
| 814 | CCC | Hiking | 6 | Mt. Rainier |
| | | Cycling | 5 | STP |
| 816 | BDK | Hiking | 3 | Bunker Shot |
| | | Golf | 2 | |
| 818 | SFC | Cycling | 7 | STP |
| | | Intellectual Property | 8 | Recapture |

METHODS, DEVICES, AND MEDIUMS ASSOCIATED WITH DYNAMIC FORUM GENERATION

BACKGROUND

Internet users seeking information with respect to a particular area of interest or looking for recommendations with respect to a particular subject may ask questions at online discussion sites, such as Internet forums or message boards. Known forums may address and discuss different topics, and may require user registration for the user to join the forum. Joining multiple forums may involve multiple, different user registrations. Participation in the forum may be open to any Internet user who has an interest in joining the forum.

The types of questions asked and the types of subjects discussed in known forums may vary, and there may be a substantial time lag between the user asking a question and the user receiving a reply with respect to their question. The quality of the reply the user receives may vary based on the person or the persons responding to the user's question, and the user may receive different and/or contradictory replies with respect to their question. In some cases, the user may not receive any replies with respect to their question. In other cases, the user may be inundated with responses, some of which may be relevant, and some of which may not be relevant.

Moreover, some of the responses may not address the user's question, or may be directed toward comments or issues raised by a person other than the user who asked the question. Consequently, such known forums may become an intricate conglomeration of conversations and side-conversations that fail to resolve the user's question, and quickly may become disorganized and fail to provide useful information to the user.

DETAILED DESCRIPTION

People may ask general questions about general topics, such as questions about restaurants, movies, and/or books, to a group of friends or co-workers. For example, a person may ask for a recommendation on a good restaurant to go to before watching a baseball game. The questions may be asked in person, by e-mail, by text messaging, by a phone call, by other types of communication, or any combination thereof. The group of friends or co-workers may exchange opinions with respect to the question, and the person who asked the question may decide upon on action, e.g., which restaurant to go to, which movie to watch, or which book to read, based on the exchanged information.

When a person has questions with respect to a specific subject, the person may have a desire to locate a group of people who have special interest or expertise in the specific subject beyond that which may be available from a group of friends and/or co-workers. For example, a person looking for a recommendation of a hiking trail may wish to ask a group of hikers for a recommendation with respect to hiking trails. Similarly, a person with a question on astronomy may wish to ask their question to a group of people who study or follow current events in the field of astronomy.

Figure 1:
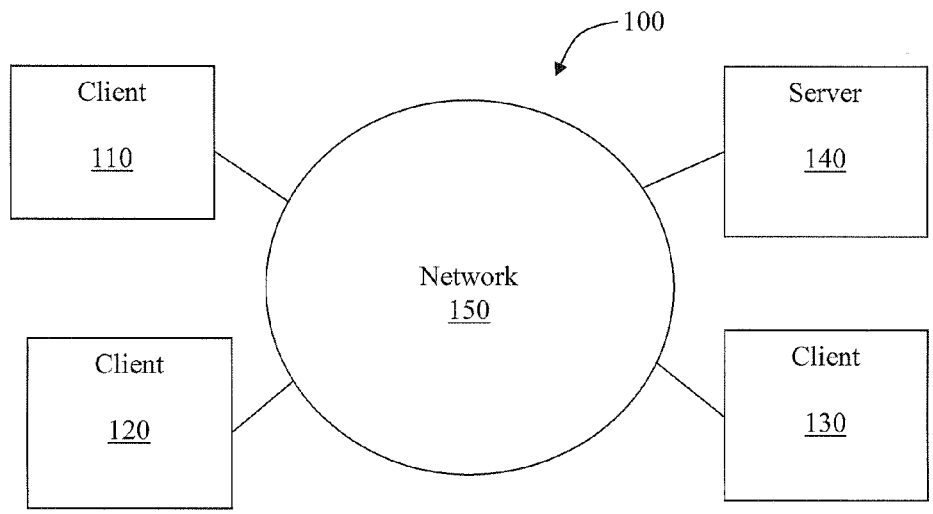
FIG. 1 depicts an example of a system configured to generate a forum.

In view of the foregoing, FIG. 1 depicts an exemplary system 100 configured to generate a forum. System 100 may comprise a network 150 configured to operatively couple a plurality of clients 110, 120, and 130 to each other. Clients 110, 120, 130 may comprise computing devices with software programs configured to interact with a server 140 and other clients over network 150. Clients 110, 120, 130 may comprise an endpoint device or customer node, such as a mobile telephone, a smart-phone, a personal data assistant (PDA), a personal computer (PC), a laptop computer, other processing devices, or any combination thereof.

One or more of clients 110, 120, 130 may be associated with members or member accounts of a network of users. For example, one or more clients 110, 120, 130 may register or request to become part of a member community associated with network 150. Network 150 may comprise a public network or a private network. Network 150 may be configured to communicate with, or obtain information from, another network, such as the Internet. Network 150 may comprise a cable network, a satellite network, a cellular network, a telephone network, a broadband network, a local area network, an intranet, other types of wired or wireless networks, or any combination thereof.

Server 140 may comprise a processing device or computing device and one or more memory devices, storage devices, databases, or any combination thereof. Server 140 may be configured to manage interactions and communications between clients 110, 120, 130. Server 140 may comprise multiple servers and storage area networks configured to maintain and to provide management functions associated with clients 110, 120, 130.

Server 140 may be configured to manage or provide a service associated with answering questions or providing information. The service may be provided to members of a community including clients 110, 120, 130. In one example, clients 110, 120, 130 may be registered members of the member community. In another example, clients 120 and 130 may be members of the community, and client 110 may not be a member of the community. Client 110, e.g., an interrogator or a questioner, may submit a request for information to server 140.

Server 140 may be configured to identify a subject matter associated with the request from client 110. Server 140 may be configured to determine the subject matter from the content of the request. In one example, client 110 may provide the subject matter. Server 140 also may be configured to generate a forum comprising members associated with the subject matter. For example, server 140 may be configured to generate a forum comprising clients 120 and 130. In one example, the forum further may comprise client 110.

Server 140 may be configured to initiate a session of the forum. The forum may be configured to allow discussion associated with a request for information. Clients 120 and 130 may respond to a request provided by client 110 by providing information associated with the request. Server 140 also may be configured to terminate the forum in response to a conclusion of the session.

In one example, clients 110, 120, 130 may comprise smartphones operatively coupled to server 140 over a cellular network. Server 140 may be configured to post the request to a group of members or users chosen from the member community, such as a member community associated with an AskAnythingAnytime ("AAA") service. The AAA service may be provided by a cellular network provider configured to exchange information among subscribers using smartphones in substantially real-time. Server 140 may be configured to maintain a database of AAA community members and associated attributes and/or expertise.

The community members may specify an area of expertise, special interest, and/or attribute during a registration or subscription process. Each community member may be associated with a plurality of attributes Server 140 may be configured to compare the subject matter of the request with the attributes of the community members. Server 140 also may be configured to identify or select forum members from the community members based on the comparison. The forum members may comprise a subset of the total member population associated with the member community. The selected forum members may be considered as an expert group related to the subject matter of the request.

In response to receiving a new question or request, server 140 may be configured to identify or select a different expert group associated with a new forum. Some community members may belong to more than one forum. Server 140 also may be configured to form multiple forums which operate concurrently, or which may be associated with sessions which overlap in duration. The forums may be dynamically generated and terminated in response to associated sessions being initiated and concluded, respectively.

Questions and requests for information may be submitted by client 110 using communication formats comprising short message service (SMS), multimedia messaging service (MMS), e-mail, speech to text, Internet chat, other types of wireless and wired communication formats, or any combination thereof. Information and responses exchanged during the forum may be provided by clients 120, 130 using the same, or similar, communication formats used by client 110.

All of the forum members who receive the request may send a reply to the questioner. The reply may be viewed by all the forum members. In one example, forum members may communicate with each other separately from the forum discussion. For example, client 120 may communicate with client 130 without providing a response, or prior to responding to the questioner, such as to client 110. The communication between clients 120 and 130 may be private. The private communication may allow members to exchange opinions or initiate comments without the knowledge of the questioner.

Figure 2:
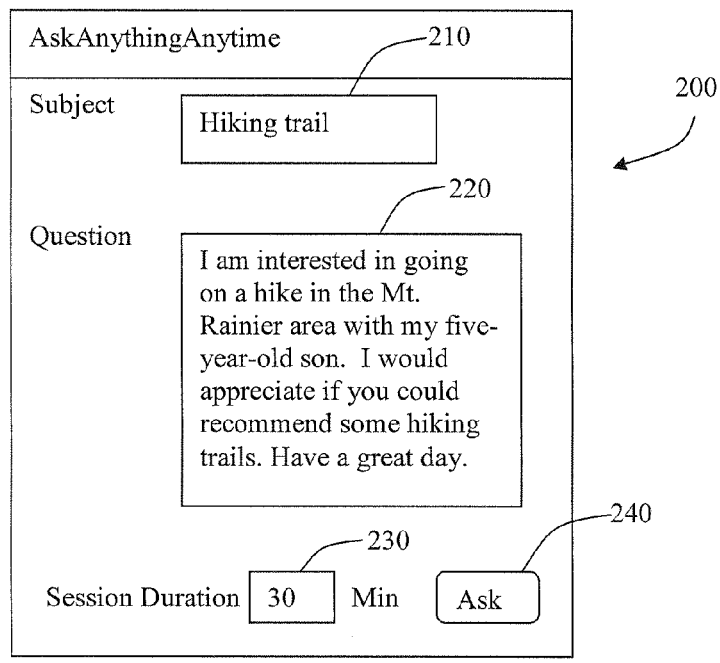
FIG. 2 depicts an example of a graphic user interface configured to submit a request.

FIG. 2 depicts an exemplary graphic user interface 200 configured to submit a request. Graphic user interface 200 may be accessible by a user, questioner, forum member, or any combination thereof. For example, client 110 (FIG. 1) may comprise or may be configured to display graphic user interface 200 used to submit the question or request for information to server 140 as part of the forum service.

Subject matter 210 may be entered into a text box or field of graphic user interface 200. Subject matter 210 may be used to identify the name of the associated forum. A request 220, for example a question, may be explicitly identified, entered, or provided by a user in a separate text box or field of graphic user interface 200. In one example, subject matter 210 may be inferred, extracted, determined, or generated from key words provided in request 220 without the user separately providing subject matter 210.

After request 220 has been entered, the user may submit request 220 by selecting or pressing a submit button 240. Submission of request 220 may result in the generation of a forum comprising an expert group of members associated with a member community. The expert group may comprise members who have expertise or interest in subject matter 210. The forum may be dynamically generated in response to the submission of request 220. The forum may not have previously existed prior to the submission of request 220. Request 220 may be posted or otherwise provided to the forum members to elicit information or a response to request 220.

Graphic user interface 200 may comprise a time limit 230. Time limit 230 may comprise a text box or field that may be used to enter a numerical value. Time limit 230 may include a designation or proposal for the duration of a session of the forum. Time limit 230 may designate a number of seconds, minutes, hours, days, months, years, or any combination thereof. In one example, the user who submits request 220 may designate time limit 230. Time limit 230 may comprise an allowable range of times comprising upper and lower boundaries. The user may select time limit 230 that complies with the allowable range of times.

Time limit 230 may comprise a predetermined amount of time. Time limit 230 may default to the predetermined amount of time, for example, if the user does not enter any time. The predetermined amount of time may be based on a type of request 220, subject matter 210, the status or identification of the user, whether a service fee has been paid by the user, or any combination thereof.

Figure 3:
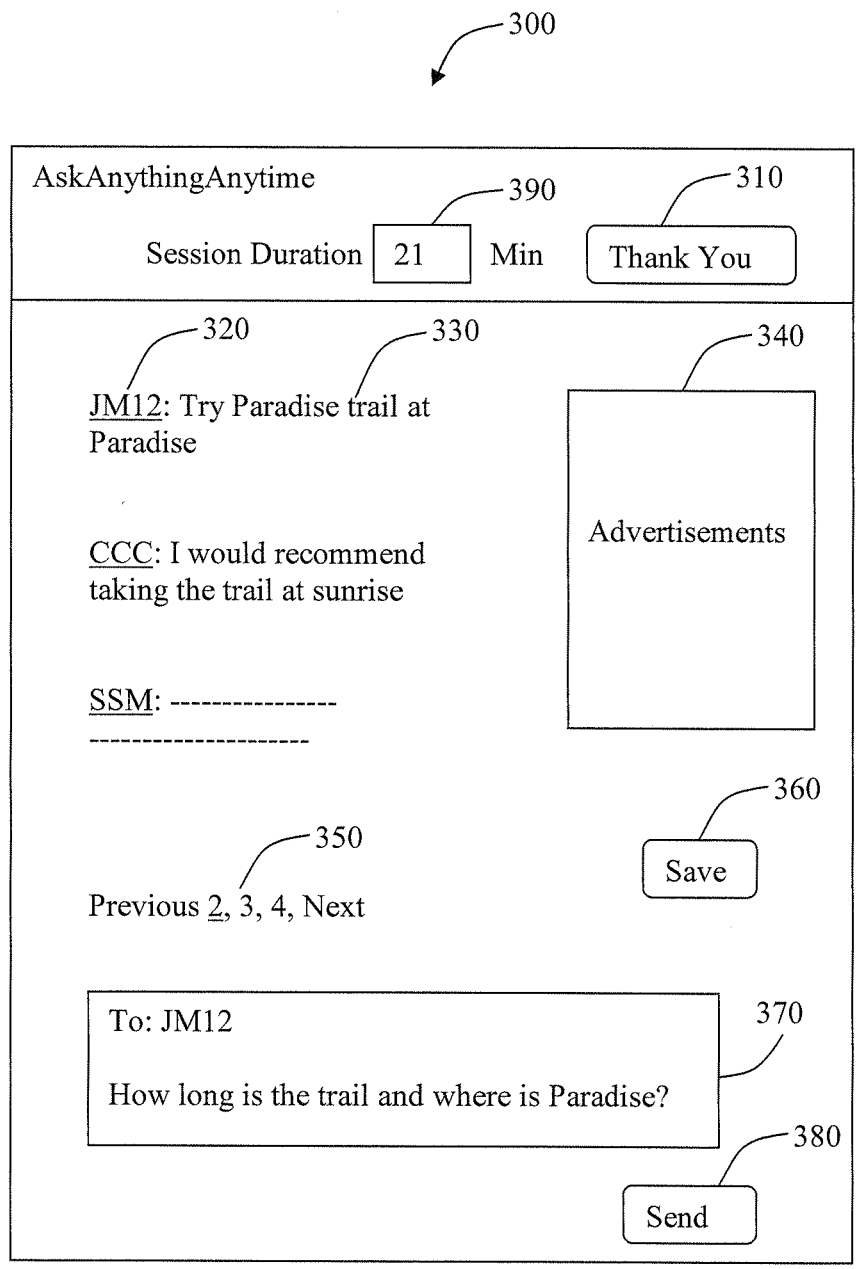
FIG. 3 depicts an example of a graphic user interface configured to display information associated with a forum.

FIG. 3 depicts an exemplary graphic user interface 300 configured to display information associated with a forum. Graphic user interface 300 may be accessible by a user, questioner, forum member, or any combination thereof. For example, client 110 (FIG. 1) may comprise or be configured to display graphic user interface 300 used to view the discussion associated with an established forum.

Graphic user interface 300 may be configured to display information 330, such as comments or replies to a request, associated with one or more forum members 320. Forum members 320 may be identified by a username, such as a nickname, or other type of user designation. The nickname may be specified by forum members 320 upon joining or registering with the member community. In one example, information 330 may be provided without identifying or designating forum members 320, such that forum members 320 may remain anonymous. Graphic user interface 300 may be configured to display information 330 from a plurality of different forum members 320. Information 300 may be displayed sequentially, or in response to information 300 being posted by forum members 320.

Graphic user interface 300 may be configured to display a plurality of pages of discussion. A navigation tool 350 may be provided to allow a selection of a specific page or section of the discussion for viewing. The question may move to a different page by selecting a page number.

Graphic user interface 300 may be configured to save information 330. For example, the user may press or otherwise select save button 360 to save the discussion associated with the forum. The community members may be able to retrieve and review stored information associated with past forums.

Graphic user interface 300 may be configured to receive a supplemental request 370 during the forum. Supplemental request 370 may be submitted in response to information 330 provided by one or more forum members 320. Supplemental request 370 may be submitted by the same user who submitted request 220 as set forth in FIG. 2 and per the corresponding description of graphic user interface 200 as depicted therein. The supplemental request 370 may be submitted in response to a selection of supplemental request button 380.

Graphic user interface 300 may be configured to display an advertisement 340. Advertisement 340 may be selected according to key words included in information 330, supplemental request 370, the subject matter of the forum, or any combination thereof. In one example, advertisement 340 may be selected by a service provider according to attributes associated with forum members 320 or according to the user associated with supplemental request 370. Advertisement 340 may comprise hyperlinks to related web pages that include offers or special deals.

Graphic user interface 300 may be configured to display a duration 390 associated with the session. For example, duration 390 may identify how much time remains in the session, or how much time has transpired since the session was initiated. In one example, duration 390 initially may be set equal to time limit 230, as set forth in FIG. 2, and per the corresponding description of graphic user interface 200. Graphic user interface 300 may be configured to begin decrementing or counting down duration 390 in response to an initiation of the forum session. The session may conclude or expire in response to duration 390 reaching zero.

Receipt of information 300 may be acknowledged by the selection of an acknowledgement button 310. For example, information 300 may comprise a satisfactory response to a question asked by the user. Pressing or selecting acknowledgement button 310 may provide a command or request to conclude the session. The session may be concluded in response to the submission of the request to conclude the session. In one example, acknowledgement button 310 may be selected or pressed prior to duration 390 reaching zero. Similarly, the session may conclude prior to duration 390 reaching zero. The forum may be dismantled or terminated in response to the conclusion of the session.

Figure 4:
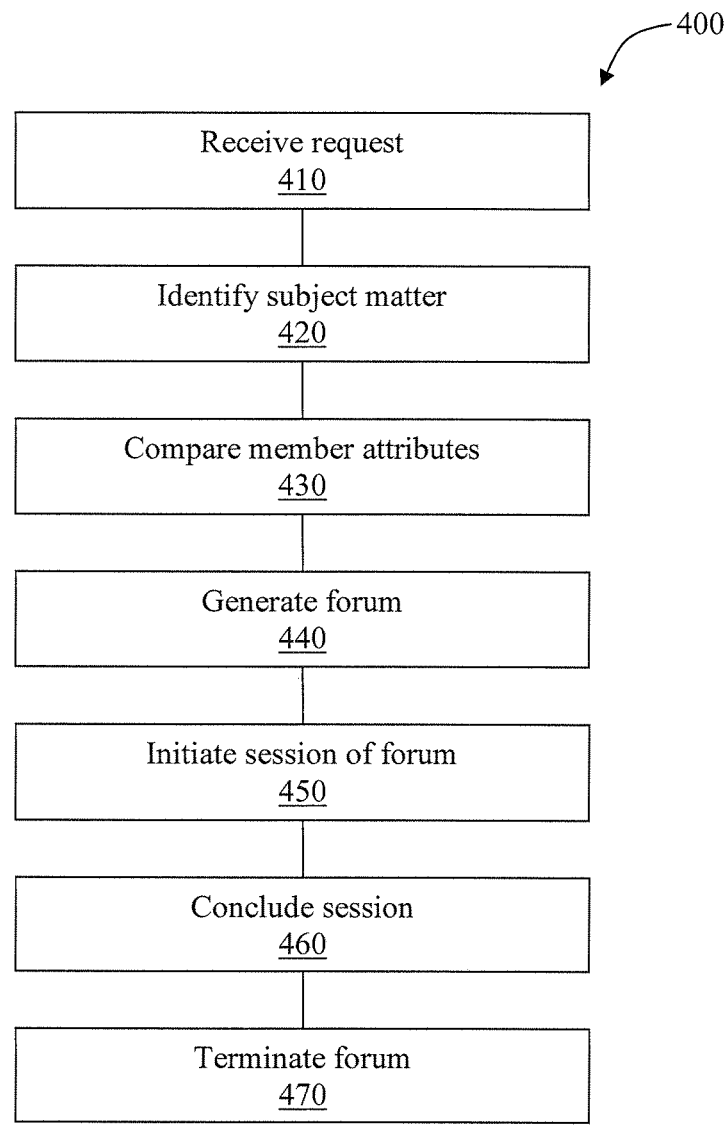
FIG. 4 depicts an example of a process associated with initiating a session of a forum.

FIG. 4 depicts an exemplary process 400 associated with initiating a session of a forum. At operation 410, a request for information may be received. For example, a server, such as server 140 may receive a question or request for information from a user, such as client 110 (FIG. 1). The request may be submitted via a graphic user interface, such as graphic user interface 200 (FIG. 2).

At operation 420, a subject matter associated with the request may be identified. The subject matter may be specified by the user or extracted from the request. The subject matter may be identified by analyzing key words included in the request. The subject matter may be explicitly identified from the request. In one example, the subject matter and the request may be identified in separate data fields.

At operation 430, attributes of members of the member community may be compared with the subject matter. For example, community members having attributes that provide a predefined correlation, or highest level of correlation, with the subject matter may be identified or selected.

At operation 440, a forum may be generated comprising members associated with the subject matter. The forum members may comprise a subset of a member community available for selection into the forum. The forum members may be identified as having knowledge, expertise, and/or an interest with respect to the subject matter.

At operation 450, a session of the forum may be initiated. The forum may be configured to allow discussion associated with the request.

At operation 460, the session may be concluded. The session may be concluded in response to receiving a request to conclude the session. In one example, the session may be set to conclude after a predetermined amount of time. The predetermined amount of time may be specified as part of, or at the same time as, the request.

At operation 470, the forum may be terminated in response to a conclusion of the session. In one example, the forum may be terminated in response to receiving a request to conclude the session.

Figure 5:
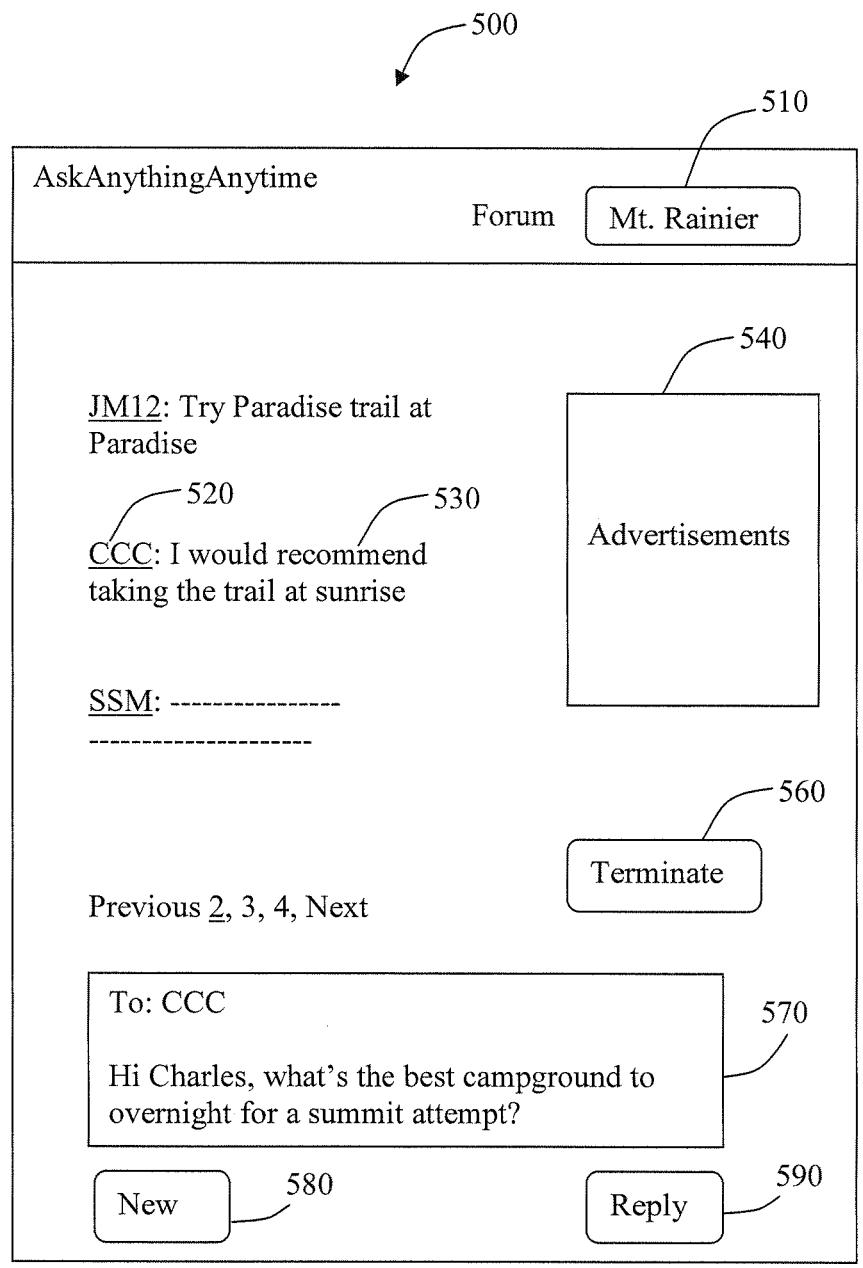
FIG. 5 depicts another example of a graphic user interface configured to display information associated with a forum.

FIG. 5 depicts an exemplary graphic user interface 500 configured to display information associated with a forum 510. A description of forum 510 may be provided in a text box or a field of graphic user interface 500. Users may be able to select forum 510 or different forums from graphic user interface 500 from a drop down listing of established forums.

In one example, graphic user interface 500 may be provided to forum members other than the user who submitted the request for information. For example, client 120 and client 130 (FIG. 1) may comprise or be configured to display graphic user interface 500 for responding to the question or request for information associated with the established forum.

Graphic user interface 500 also may be configured to conclude or terminate the session of forum 510. For example, a user may request to conclude or terminate the session by selecting or pressing a terminate button 560. Selection of terminate button 560 may provide a command or request to conclude the session. The request to conclude the session may be received by from one or more of the forum members. The session may conclude in response to the submission of the request to conclude the session. In one example, the session may conclude after a threshold number or percentage of forum members have requested to conclude the session. The request to conclude the session may be received after one or more of the forum members provide information or respond to the request.

A forum member may submit a response 570 to a request for information. Response 570 may be posted as information 530 in graphic user interface 500, for example response 570 may be posted next to the identification or name associated with the corresponding forum members 520 who submitted response 570. A reply button 590 may be pressed or otherwise selected to indicate that response 570 may be directed to the request for information or question which initiated the session of forum 510. Reply button 590 may be configured to present information 570 to all of the forum members 520. Forum members 520 may be rated, ranked, classified, or scored according to a frequency of replying to previous requests or pressing reply button 590. In one example, forum 510 may be generated based, at least in part, on the ranking of forum members 520.

New forum button 580 may be pressed or otherwise selected to indicate that response 570 may be directed to a new forum or a second forum. The second forum may comprise a subset of the members associated with forum 510. The second forum may be configured to continue after the session associated with forum 510 terminates. For example, a forum member may click or otherwise select one or more forum members 520, enter response 570, and then select new forum button 580. The new forum may comprise the forum member who submitted response 570, and one or more forum members 520 who submitted information 530. The second forum may comprise a private forum including two or more forum members. The second forum may be configured to allow communication associated with response 570 to occur outside of forum 510.

A forum member may request that the second forum be converted from a text mode to a telephone mode. For example, forum members 520 may be asked to talk on the telephone. In one example, forum members 520 may be called anonymously, e.g., the corresponding phone numbers and/or associated names associated with the telephone call may be hidden.

Graphic user interface 500 also may be configured to display an advertisement 540. Advertisement 540 may be selected according to key words included in information 530, in response 570, or in the subject matter of forum 510. In one example, advertisement 540 may be selected by a service provider according to attributes associated with forum members 520 who submitted information 530 or who entered response 570. Advertisement 540 may comprise hyperlinks to related web pages that include offers or special deals.

Figure 6:
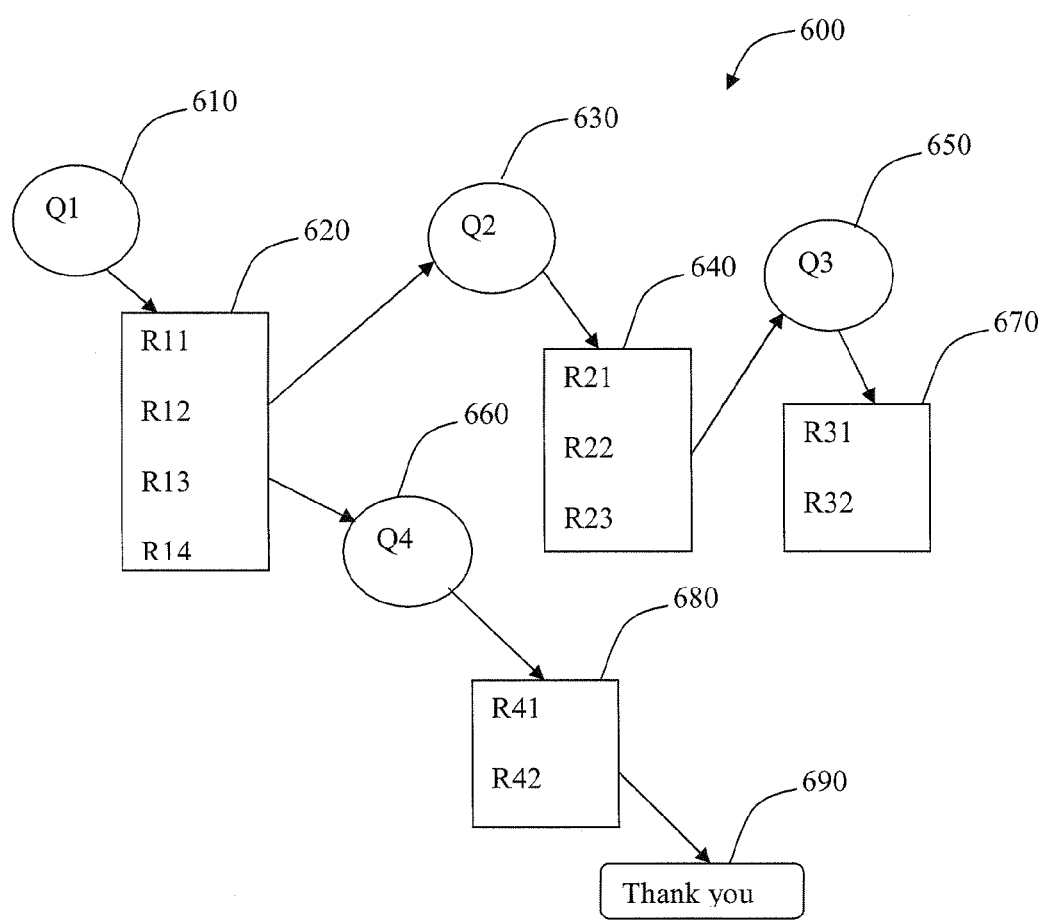
FIG. 6 depicts an example of a forum comprising a threaded discussion.

FIG. 6 depicts an exemplary forum 600 comprising a threaded discussion. The letter "Q" designates a question or a request for information, and the letter "R" designates a response or answer to the request for information. Forum 600 may be configured to accommodate substantially real-time interaction among a group of people, e.g., members or subscribers to a service, over a communications network. A user, such as a requester, a questioner, or a member of a community, may post the request or the question related to a subject matter. A service provider may be configured to identify a group of experts or other members of the community who may have a special interest or an expertise in the subject matter of the request. The service provider also may be configured to dynamically generate an associated forum substantially in real-time. In one example, the service provider is configured to dismantle the forum at the conclusion of the forum session.

A first request 610 may be submitted by a requester prior to the generation of a corresponding forum by the service provider. First request 610 may be submitted similarly as request 220, as set forth in FIG. 2, and per the corresponding description of graphic user interface 200. First request 610 may comprise a first question Q1 posted to the newly generated or established forum. Responsive to first request 610, a plurality of responses 620 comprising a response R11, a response R12, a response R13, and a response R14 may be posted to the forum.

The requester also may submit a supplemental request 630 comprising a second question Q2. Supplemental request 630 may be associated with response R12. Supplemental request 630 may produce a plurality of responses 640 comprising a response R21, a response R22, and a response R23. Moreover, the requester may submit a supplemental request 650 comprising a third question Q3. Supplemental request 650 may be associated with a previous response, such as response R22. Supplemental request 650 may produce a plurality of responses 670 comprising a response R31 and a response R32.

The requester also may submit a supplemental request 660 comprising a fourth question Q4. Supplemental request 660 may be associated with a previous response, such as response R13. Supplemental request 660 may produce a plurality of responses 680 comprising a response R41 and a response R42. After reviewing response 620, response 640, response 670, and/or response 680, the requester may submit a termination request 690 to terminate the session. For example, the requester may select or press an acknowledgement button, such as acknowledgement button 310, as set forth in FIG. 3 and per the corresponding description of graphic user interface 300. The session may be terminated in response to the submission of termination request 690.

Figure 7:
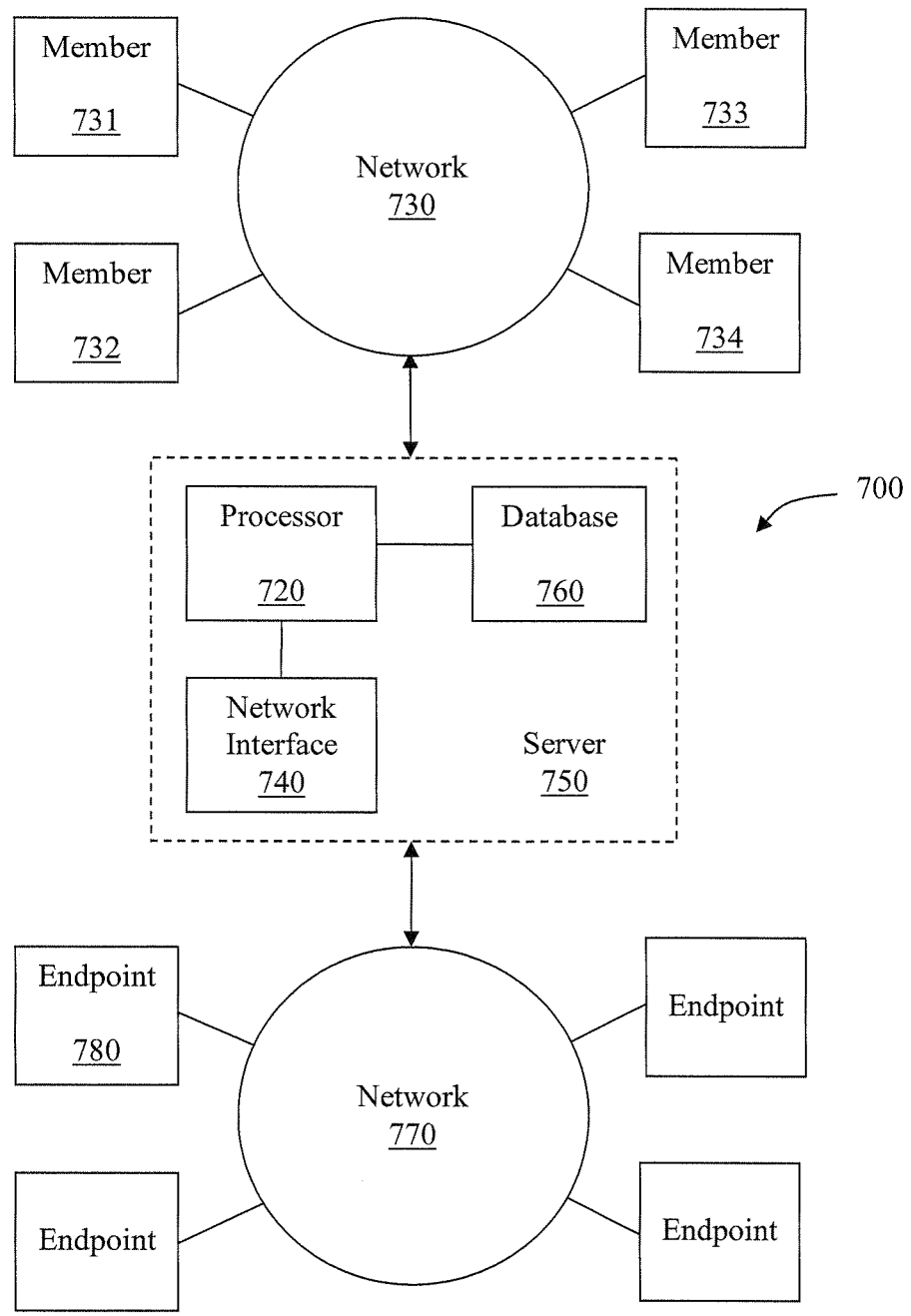
FIG. 7 depicts another example of a system configured to generate a forum.

FIG. 7 depicts another exemplary system 700 configured to generate a forum. System 700 may comprise a server 750 operatively coupled to one or more networks. Server 750 may comprise processing device 720, one or more network interfaces 740, and a database 760. Database 760 may comprise one or more storage devices and/or memory devices configured to store instructions associated with an application program. Processing device 720 may be configured to execute the instructions. Network interfaces 740 may comprise a router, a gateway, or a modem that connects server 750 to a first network 730 and/or a second network 770.

First network 730 may comprise a cable network, a satellite network, a cellular network, a telephone network, a broadband network, a local area network, an intranet, other types of wired or wireless networks, or any combination thereof. First network 730 may comprise a public network or a private network associated with a member community. The member community may comprise a plurality of members, including a first member 731, a second member 732, a third member 733, and a fourth member 734. The plurality of members may comprise endpoint devices or customer nodes such as a mobile telephone, a smart-phone, a personal data assistant (PDA), a personal computer (PC), a laptop computer, other processing devices, or any combination thereof. The plurality of members may register or request to become part of the member community associated with first network 730.

Server 750 may be configured to receive a request from an interrogator for information. The interrogator may be associated with first member 731. Server 750 also may be configured to identify members associated with a subject matter related to the request. The members may be identified from the member community according to shared attributes of members associated with the subject matter.

First network 730 may be configured to communicate with, or obtain information from, another network, such as second network 770. Second network 770 may comprise a cable network, a satellite network, a cellular network, a telephone network, a broadband network, a local area network, an intranet, other types of wired or wireless networks, or any combination thereof. In one example, second network 770 may comprise the Internet.

Second network 770 may comprise a plurality of endpoints, including endpoint 780. Endpoint 780 may comprise an endpoint device such as a mobile telephone, a smart-phone, a personal data assistant (PDA), a personal computer (PC), a laptop computer, other processing devices, or any combination thereof. Endpoint 780 may register with server 750. In one example, the interrogator may be associated with endpoint 780.

Server 750 also may be configured to generate a forum comprising a plurality of members identified as forum members. The forum members may comprise one or more of second member 732, third member 733, and/or fourth member 734. The interrogator may belong to a member community comprising the forum members. In one example, interrogator does not belong to the member community, but submits a request for information to the member community as part of a service provided by server 750. Server 750 may be configured to provide the information to the interrogator. In one example, server 750 may be configured to conclude the forum in response to providing the information to the interrogator.

Server 750 may be configured to initiate a session of the forum to allow the information to be provided to the interrogator. Server 750 also may be configured to receive confirmation from the interrogator that the information was provided. The forum may be concluded after server 750 receives the confirmation. In one example, server 750 may be configured to receive another request from the interrogator during the session, and before a conclusion of the forum.

Figures 8, 9:
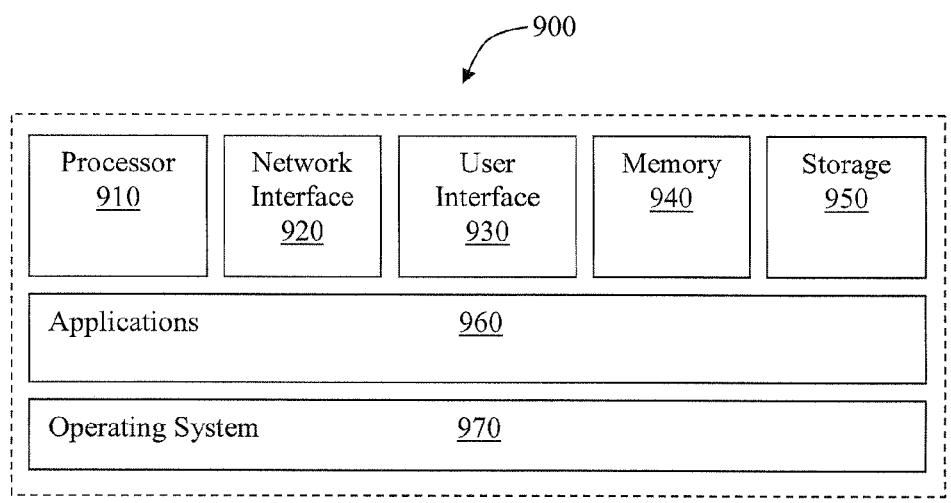
FIG. 8 depicts an example of a lookup table configured to identify a plurality of established forums.
FIG. 9 depicts a block diagram of an apparatus configured to generate a forum.

FIG. 8 depicts an exemplary lookup table 800 configured to identify a plurality of established forums. Lookup table 800 may be stored in a memory device, a storage device, a database, or any combination thereof. Lookup table 800 may identify a member community 810 comprising a first member 812, a second member 814, a third member 816, and a fourth member 818. Each member of member community 810 may be associated with one or more attributes 820. Attributes 820 may indicate an interest or expertise of a member in a related subject matter. In one example, members of member community 810 may self identify or select attributes 820 during a subscription process or a registration process. In another example, attributes 820 may be assigned to members of member community 810 based on the experience or expertise associated with the members.

Each member may be associated with a score 830. The service provider may provide incentives to the members in order to encourage the members to provide responses to the requests for information. The service provider also may assign points to the members based on a frequency or number of posted responses, and then provide services or compensation in response to the points being redeemed. For example, the service provider may not charge airtime fees to members associated with a high score based on a numerical ranking of score 830.

Each member also may be associated with one or more active forums 840. Active forums 840 may be identified as being associated with an active session. A listing of active forums 840 may be dynamically maintained or modified. For example, one or more active forums 840 may be added to table 800 in response to the generation of a forum, and one or more active forums 840 may be removed in response to the termination of the forum or the conclusion of the corresponding session. One or more members in member community 810 may belong to the same forum. For example, first member 812 and second member 814 may be associated with a first forum, such as the forum identified as "Mt. Rainier". A single member may be associated with a plurality of forums. For example, second member 814 may be associated with the first forum in addition to being associated with a second forum, such as the forum identified as "STP".

Responsive to receiving a request for information, a service provider may identify or generate a forum. The service provider may select members for the forum based on a comparison of the subject matter in a request and based on attributes 820 of members in member community 810. For example, a request for a recommendation on a hiking trail near Mt. Rainier may be associated with a subject matter comprising hiking trails. First member 812, second member 814, and third member 816 may be associated with the attribute of "Hiking". The service provider may select the members associated with attributes 820 that provide a match or are related with the subject matter.

The selected members may comprise a subset of member community 810. A plurality of members may be associated with attributes 820 that are related to the subject matter. In one example, the service provider may select or identify the forum members from the plurality of members based, at least in part, on score 830. For example, whereas first member 812, second member 814, and third member 816 may be associated with the attribute of "Hiking", the service provider may be configured to select only first member 812 and second member 814 to be part of the forum "Mt. Rainier". First member 812 and second member 814 may be associated with relatively higher scores of 9 and 6, respectively, whereas third member 816 may be associated with a relatively lower score of 3. In one example, the service provider may be configured to exclude third member 816 from the forum in response to identifying that third member 816 is associated with the relatively lower score.

Each attribute 820 may be associated with score 830. In one example, first member 812 may be assigned or associated with a first attribute, such as "Hiking", and a second attribute, such as "Car Racing". The first attribute may be associated with a first score, such as a score of 9, whereas the second attribute may be associated with a second score, such as a score of 7. In generating the forum, members may be selected from member community 810 based, at least in part, on score 830 associated with attribute 820 that relates to subject matter of the forum. Score 830 may be assigned, determined, or selected based on the experience or level of expertise of the member associated with the corresponding attribute.

FIG. 9 depicts a block diagram of an exemplary apparatus 900 configured to generate a forum. Apparatus 900 may comprise a plurality of operation modules. Apparatus 900 may comprise a processor 910, a network interface 920, a user interface 930, a memory 940, a storage 950, applications 960, and an operating system 970.

Processing device 910 may execute instructions stored on memory 940 and/or on storage 950. Network interface 920 may manage interfaces with one or more networks, such as network 150, as set forth in FIG. 1. User interface 930 may be configured to display and/or receive commands associated with graphic user interfaces, such as graphic user interface 200, graphic user interface 300, and graphic user interface 500, as set forth in FIGS. 2, 3, and 5, respectively.

Applications 960 may include instructions for, or be configured for, performing various operations as described herein. In one example, applications 960 comprise a peer-to-peer protocol or a server-based protocol. In a server-based protocol, one of the endpoints, clients, or members may act as a server. A remote computer access protocol may provide users with a graphical interface to another processing device. The protocol may utilize ITU-T T.120 series application sharing protocols.

In response to executing the instructions stored in memory 940 and/or in storage 950, processing device 910 may be configured to perform a plurality of operations. For example, processing device 910 may be configured to transmit a request for information to a member community. Processing device 910 also may be configured to analyze key words included in the request, and to identify the subject matter from the key words. The subject matter may be included in the request.

In one example, processing device 910 may be configured to identify the request from a first text entry, and to identify the subject matter included in a second text entry. Processing device 910 also may be configured to transmit the subject matter to the member community.

Processing device 910 may be configured to subscribe to a forum comprising members of the member community. The members may be associated with a subject matter of the request. The forum may be configured to be generated after the request is transmitted or posted. In one example, processing device 910 may be configured to display an advertisement. The content of the advertisement may be associated with the subject matter of the request.

Processing device 910 also may be configured to receive information in response to submitting a request. The forum may be configured to be terminated in response to receipt of the information. In one example, processing device 910 may be configured to transmit a confirmation of the receipt. The forum may be configured to be terminated after the confirmation is transmitted. Processing device 910 also may be configured to transmit a second request to the member community before the forum is terminated.

In one example, processing device 910 may be configured to transmit a request to convert the forum from a text mode to a telephone mode. The telephone mode may be configured to form an anonymous connection to one or more of the members, for example wherein a name and/or telephone number of the one or more members may be blocked.

The system and apparatus described above may use dedicated processor systems, micro controllers, programmable logic devices, or microprocessors that may perform some or all of the operations described herein. Some of the operations described above may be implemented in software and other operations may be implemented in hardware. One or more of the operations, processes, or methods described herein may be performed by an apparatus, device, or system similar to those as described herein and with reference to the illustrated figures.

The processing device may execute instructions or "code" stored in memory. The memory may store data as well. The processing device may include, but may not be limited to, an analog processor, a digital processor, a microprocessor, multi-core processor, processor array, network processor, etc. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, storage array, or portable FLASH key fob. The memory and processing device may be operatively coupled together, or in communication with each other, for example by an I/O port, network connection, etc. such that the processing device may read a file stored on the memory. Associated memory may be "read only" by design (ROM) by virtue of permission settings, or not. Other examples of memory may include, but may not be limited to, WORM, EPROM, EEPROM, FLASH, etc. which may be implemented in solid state semiconductor devices. Other memories may comprise moving parts, such a conventional rotating disk drive. All such memories may be "machine-readable" in that they may be readable by a processing device.

Operating instructions or commands may be implemented or embodied in tangible forms of stored computer software (also known as a "computer program" or "code"). Programs, or code, may be stored in a digital memory that may be read by the processing device. "Computer-readable storage medium" (or alternatively, "machine-readable storage medium") may include all of the foregoing types of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

Having described and illustrated the principles of a preferred embodiment, it should be apparent that the embodiments may be modified in arrangement and detail without departing from such principles. We claim all modifications and variation coming within the spirit and scope of the following claims.

The invention claimed is:

1. A method comprising:
   receiving, by a processing device, a request for information;
   identifying, by the processing device, a subject matter associated with the request;
   selecting, by the processing device, forum members from a member community based, at least in part, on attributes of the forum members that provide an association with the subject matter;
   generating, by the processing device, a forum comprising the forum members selected from the member community, wherein the forum is configured to allow the forum members to post comments, and to respond to posted comments, in a threaded discussion comprising one or more sessions of the forum in which there is a substantial time lag between when the comments are posted and when the posted comments are responded to, and wherein the comments from the forum are stored and made available to the forum members for retrieval;
   initiating, by the processing device, a session of the forum configured to allow discussion associated with the request;
   receiving, by the processing device, a number of requests from more than one and less than all of the forum members to conclude the session; and
   terminating, by the processing device, the forum in response to determining that the number of requests exceeds a threshold number of requests to conclude the session.

2. The method of claim 1, wherein the forum members comprise a subset of the member community available for selection into the forum.

3. The method of claim 2, wherein generating the forum comprises:
   comparing, by the processing device, the attributes of the forum members of the member community with the subject matter; and
   selecting, by the processing device, the forum members having attributes that provide a predefined correlation with the subject matter.

4. The method of claim 1, wherein the forum members are identified as having knowledge with respect to the subject matter.

5. The method of claim 1, wherein the subject matter is identified by analyzing key words included in the request.

6. The method of claim 1, wherein the subject matter is explicitly identified from the request.

7. The method of claim 6, wherein the subject matter and the request are identified in separate data fields.

8. The method of claim 1, wherein the session is set to conclude after a predetermined amount of time.

9. The method of claim 8, wherein the predetermined amount of time is specified as part of the request.

10. The method of claim 1, further comprising receiving, by the processing device, a confirmation that the information has been provided, wherein terminating the forum comprises terminating the forum in response to both receiving the requests to conclude the session and receiving the confirmation.

11. The method of claim 1, wherein the attributes of the forum members comprise a ranked level of expertise of the forum members in the subject matter.

12. A computer-readable memory device having instructions stored thereon that, in response to execution by a processing device, cause the processing device to perform operations comprising:
 receiving a request for information;
 identifying a subject matter associated with the request;
 selecting forum members from a member community based, at least in part, on attributes of the forum members that provide an association with the subject matter;
 generating a forum comprising a number of the forum members selected from the member community, wherein the forum is configured to allow the forum members to post comments, and to respond to posted comments, in a threaded discussion comprising one or more sessions of the forum in which there is a substantial time lag between when the comments are posted and when the posted comments are responded to, and wherein the comments from the forum are stored and made available to the forum members for retrieval;
 initiating a session of the forum configured to elicit a response to the request;
 receiving a number of requests to conclude the session from more than one and less than the number of the forum members associated with the forum; and
 disbanding the forum in response to determining that the number of requests exceeds a threshold number of requests to conclude the session.

13. The computer-readable memory device of claim 12, wherein the operation comprising generating the forum includes:
 comparing the attributes of the forum members in the member community with the subject matter; and
 selecting the forum members having attributes that are related to the subject matter.

14. The computer-readable memory device of claim 13, wherein the operation comprising comparing the attributes includes identifying the forum members having an expertise with respect to the subject matter.

15. The computer-readable memory device of claim 13, wherein the comparison of the attributes identifies an interest level associated with the forum members in the subject matter.

16. The computer-readable memory device of claim 12, wherein the operations further comprise setting a time limit for the session to conclude.

17. The computer-readable memory device of claim 16, wherein the threshold number of requests to conclude the session is received prior to the time limit.

18. The computer-readable memory device of claim 12, wherein the operation comprising selecting the forum members comprises selecting the forum members according to a frequency of participation in responding to previous requests.

19. A system, comprising:
 means for identifying a subject matter associated with a question;
 means for generating a forum comprising forum members selected from a member community based, at least in part, on attributes of the forum members that provide an association with the subject matter, wherein the forum is configured to allow the forum members to post comments, and to respond to posted comments, in a threaded discussion comprising one or more sessions of the forum in which there is a substantial time lag between when the comments are posted and when the posted comments are responded to, and wherein the comments from the forum are stored and made available to the forum members for retrieval;
 means for initiating a session of the forum configured to allow discussion associated with the question; and
 means for terminating the forum in response to receiving a threshold number of requests to conclude the session from more than one of the forum members and less than all of the forum members.

20. The system of claim 19, wherein the means for generating comprises means for setting a maximum duration of the session.

21. The system of claim 20, wherein the requests to conclude the session are received prior to the maximum duration.

22. The system of claim 21, wherein the requests to conclude the session include a request that is received from a client.

23. The system of claim 22, wherein the question is received from the client.

24. The system of claim 22, wherein the forum further comprises the client.

25. The system of claim 19, wherein the requests to conclude the session are received after one or more of the forum members respond to the question.

26. The system of claim 19, wherein the means for generating further comprises, in response to receiving a request from one of the forum members, means for generating a second forum comprising a subset of the forum members, wherein the second forum is configured to continue after the session is terminated.

27. The system of claim 19, wherein the means for generating comprises means for generating the forum based, at least in part, on a ranking of the forum members according to a frequency of replying to previous requests.

28. The system of claim 19, wherein the means for terminating comprises means for terminating the forum in response to both receiving the threshold number of requests to conclude the session and receiving a confirmation that the question was answered.

\* \* \* \* \*